US006912005B2

(12) United States Patent
Senda (10) Patent No.: US 6,912,005 B2
(45) Date of Patent: Jun. 28, 2005

(54) ELECTRONIC CAMERA RECORDING/PLAYBACK APPARATUS FOR SHOOTING PICTURES AND EDITING SHOT DATA

(75) Inventor: Tamotsu Senda, Ehime (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 795 days.

(21) Appl. No.: 09/810,161

(22) Filed: Mar. 19, 2001

(65) Prior Publication Data

US 2002/0130962 A1 Sep. 19, 2002

(51) Int. Cl.[7] .............................................. H04N 5/225
(52) U.S. Cl. ................................. 348/333.06
(58) Field of Search ....................... 348/207.99, 333.06, 348/333.01, 333.07, 333.11, 333.12, 373, 374, 375; 386/117, 118; 455/556

(56) References Cited

U.S. PATENT DOCUMENTS

| | | | | |
|---|---|---|---|---|
| 5,442,453 A | * | 8/1995 | Takagi et al. | 386/118 |
| 5,739,859 A | * | 4/1998 | Hattori et al. | 348/375 |
| 5,982,429 A | * | 11/1999 | Kamamoto et al. | 348/333.06 |
| 6,295,088 B1 | * | 9/2001 | Tsukahara et al. | 348/333.06 |
| 6,483,542 B1 | * | 11/2002 | Morinaga | 348/333.06 |
| 6,700,621 B1 | * | 3/2004 | Seo | 348/375 |

\* cited by examiner

Primary Examiner—Tuan Ho
(74) Attorney, Agent, or Firm—Wenderoth, Lind & Ponack, L.L.P.

(57) ABSTRACT

An electronic camera recording/playback apparatus operable to both shoot a subject and edit shot data. The apparatus comprises a main unit and a display unit for displaying a shot image or an edited image, and the display unit is able to take plural attitudes to the main unit which are: a closed attitude in which a display screen of the display unit confronts the side surface of the main unit, and the rear surface of the display unit is exposed; a shooting attitude in which the display unit is released from the side surface of the main unit; and an editing attitude in which the display screen of the display unit is parallel to the side surface of the main unit and is exposed. Therefore, it is possible to provide an electronic camera recording/playback apparatus which is simple to operate and which enables shooting and editing of shot data.

8 Claims, 7 Drawing Sheets

ELECTRONIC CAMERA RECORDING/PLAYBACK APPARATUS FOR SHOOTING PICTURES AND EDITING SHOT DATA

FIELD OF THE INVENTION

The present invention relates to an electronic camera recording/reproduction apparatus which is operable to both shoot pictures and to edit shot data.

BACKGROUND OF THE INVENTION

Conventionally, there have been two types of electronic camera recording/playback apparatuses, one not having a function of editing and the other having the function of editing. The electronic camera recording/playback apparatus not having the function of editing must use equipment such as a personal computer or the like to edit shot data.

Figure 9:
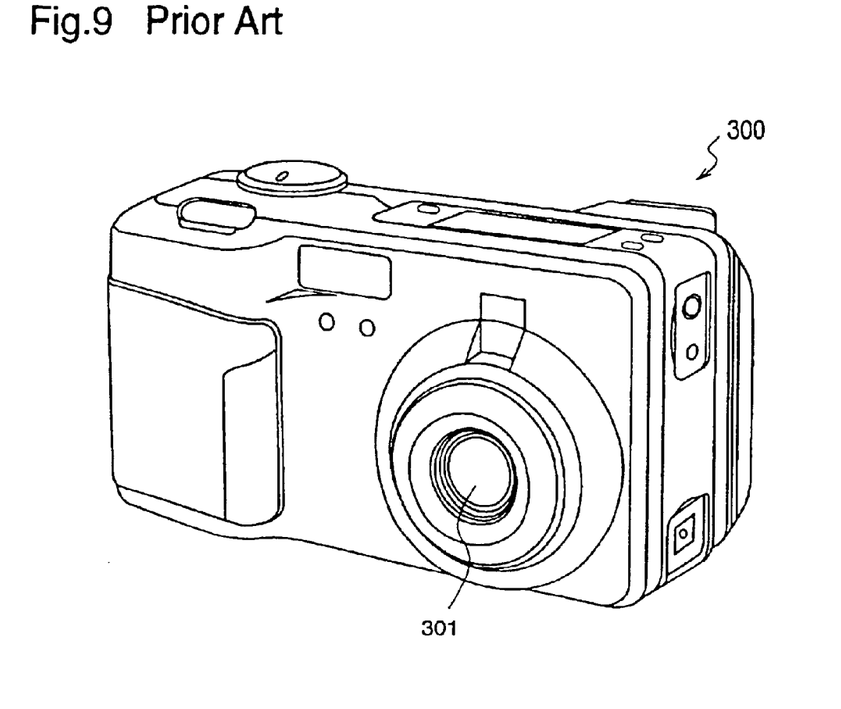
FIG. 9 is a forward perspective view illustrating the construction of a conventional electronic camera recording/playback apparatus.
Figure 10:
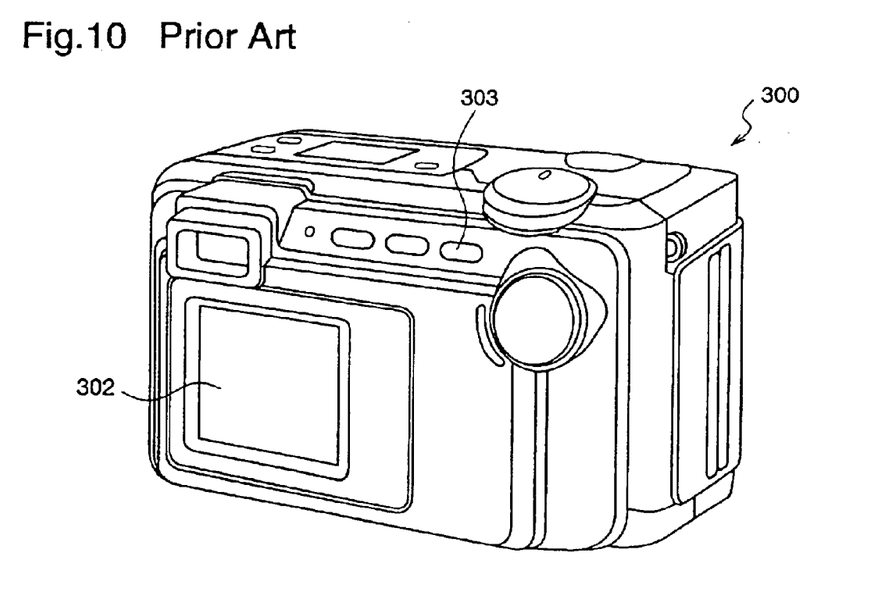
FIG. 10 is a rear perspective view illustrating the construction of the conventional electronic camera recording/playback apparatus.

Hereinafter, an example of a conventional electronic camera recording/playback apparatus will be described with reference to FIGS. 9 and 10. Initially, the structure of the conventional electronic camera recording/playback apparatus will be described. FIGS. 9 and 10 are a forward perspective view and a backward (rear) perspective view, respectively, illustrating the structure of a conventional electronic camera recording/playback apparatus 300. The conventional electronic camera recording/playback apparatus 300 is provided with a lens 301, a liquid crystal display 302, and operation buttons 303.

Next, the operation of the conventional electronic camera recording/playback apparatus 300 will be described. When the operator points the lens 301 at a subject, the subject is reflected on the liquid crystal display 302, and the operator can shoot the subject by pressing the operation button 303. In order to edit the shot data, the operator connects a personal computer to the electronic camera recording/playback apparatus 300 by a cable, starts software for editing the shot data on the personal computer, and edits the shot data on the screen of the personal computer.

On the other hand, it is not easy for the operator to perform editing with the conventional electronic camera recording/playback apparatus having the function of editing because of restrictions on its structure. Further, since the main unit of the apparatus must be compact, the number of operation buttons to be provided is limited. Therefore, it is difficult to increase the operations which are required for editing. Further, the apparatus must be provided with an operation button for switching the operation mode between the shooting mode and the editing mode. Although there has been an electronic camera recording/playback apparatus having a touch panel on a liquid crystal display to increase the number of operation buttons and thereby to improve the operability, since the operator directly touches the liquid crystal display for operation, bleeding may occur on the liquid crystal display or the liquid crystal display may be contaminated by fingerprints.

SUMMARY OF THE INVENTION

The present invention is made to solve the above-described problems and its object is to provide an electronic camera recording/playback apparatus which is simple to operate and which enables both shooting and editing of shot data.

Other objects and advantages of the present invention will become more apparent from the following detailed description. The detailed description and specific embodiments described herein are provided only for illustration since various additions and modifications within the scope of the present invention will be apparent to those skilled in the art from the detailed description.

According to a first aspect of the present invention, there is provided an electronic camera recording/playback apparatus having the function of shooting a subject and the function of editing shot data. The electronic camera recording/playback apparatus comprises a main unit and a display unit which displays a shot image or an edited image. Further, the electronic camera recording/playback apparatus is able to take plural attitudes to the main unit, wherein the display unit takes: a closed attitude in which a display screen of the display unit confronts the side surface of the main unit and the rear surface of the display unit is exposed; a shooting attitude in which the display unit is released from the side surface of the main unit; and an editing attitude in which the display screen of the display unit is parallel to the side surface of the main unit and is exposed to the outside. Therefore, the electronic camera recording/playback apparatus is easy to handle in the closed attitude, and it enables the operator to perform shooting and editing easily.

According to a second aspect of the present invention, the electronic camera recording/playback apparatus of the first aspect includes: attitude recognition means for recognizing that the display unit takes any one of the closed attitude, the shooting attitude, and the editing attitude; and mode switching means for setting the main unit in the power-off state, the ready-for-shooting state, or the ready-for-editing state when the attitude recognition means recognizes that the display unit takes the closed attitude, the shooting attitude, or the editing attitude, respectively. Therefore, the electronic camera recording/playback apparatus obviates the need for the operator to perform mode switching.

According to a third aspect of the present invention, in accordance with the electronic camera recording/playback apparatus of the second aspect, the display unit is provided with a plurality of operation buttons which are arranged on the periphery of the display screen. The respective operation buttons are used correspondingly to the operations for shooting in the shooting attitude and the operations for editing in the editing attitude in the shooting attitude and in the editing attitude, respectively. Therefore, the editing functions can be increased without increasing the number of operation buttons. Further, there is no need to provide a touch panel.

According to a fourth aspect of the present invention, in accordance with the electronic camera recording/playback apparatus of the third aspect, the mode switching means displays, on the display screen, the function descriptions of the respective operation buttons in each of the shooting attitude and the editing attitude in positions corresponding to the respective operation buttons. Therefore, in both of the shooting attitude and the editing attitude, the operator can easily read the function descriptions.

According to a fifth aspect of the present invention, the electronic camera recording/playback apparatus of the fourth embodiment further includes: mounting means on which an external memory unit for holding system data of other equipment is mounted; mounting recognition means for recognizing that the external memory unit is mounted on the mounting means; and system data storage means for holding the system data that is stored in the external memory unit. Therefore, it is possible to use the electronic camera recording/playback apparatus as other equipment by mounting an external memory unit which holds system data of the other equipment on the mounting means.

DETAILED DESCRIPTION OF THE INVENTION

First Embodiment

Hereinafter, an electronic camera recording/playback apparatus according to a first embodiment of the present invention will be described with reference to the drawings.

Figure 1:
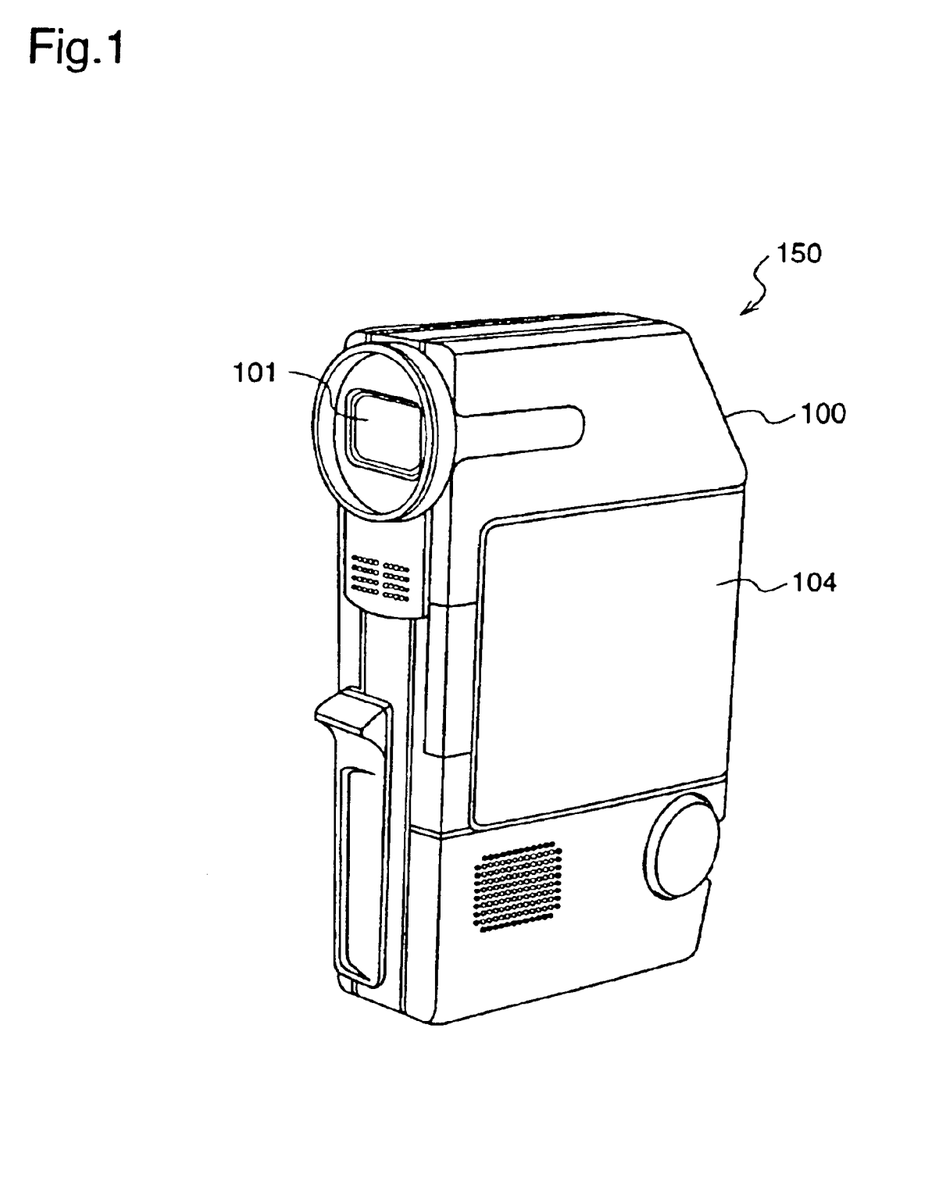
FIG. 1 is a forward perspective view illustrating the closed attitude of an electronic camera recording/playback apparatus according to a first embodiment of the present invention.
Figure 2:
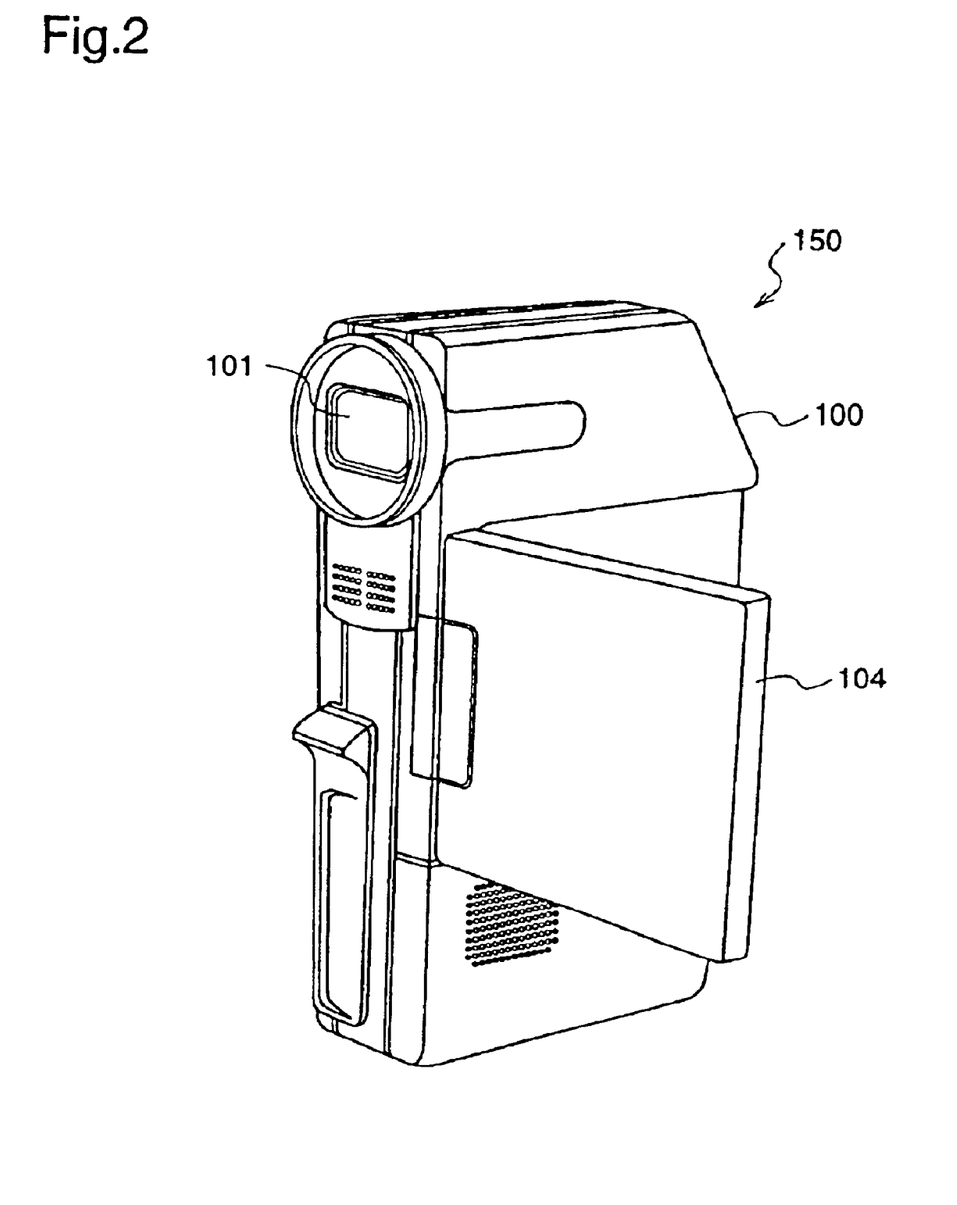
FIG. 2 is a forward perspective view illustrating the shooting attitude of the electronic camera recording/playback apparatus according to the first embodiment.
Figure 3:
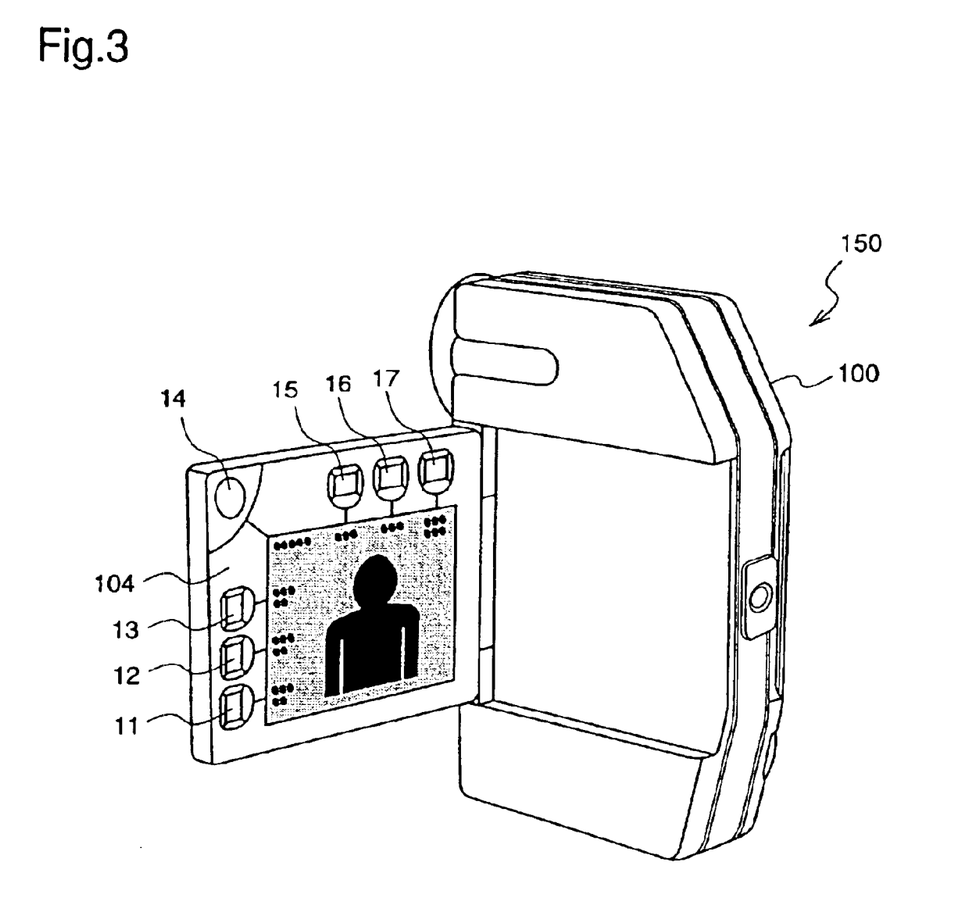
FIG. 3 is a rear perspective view illustrating the shooting attitude of the electronic camera recording/playback apparatus according to the first embodiment.
Figure 4:
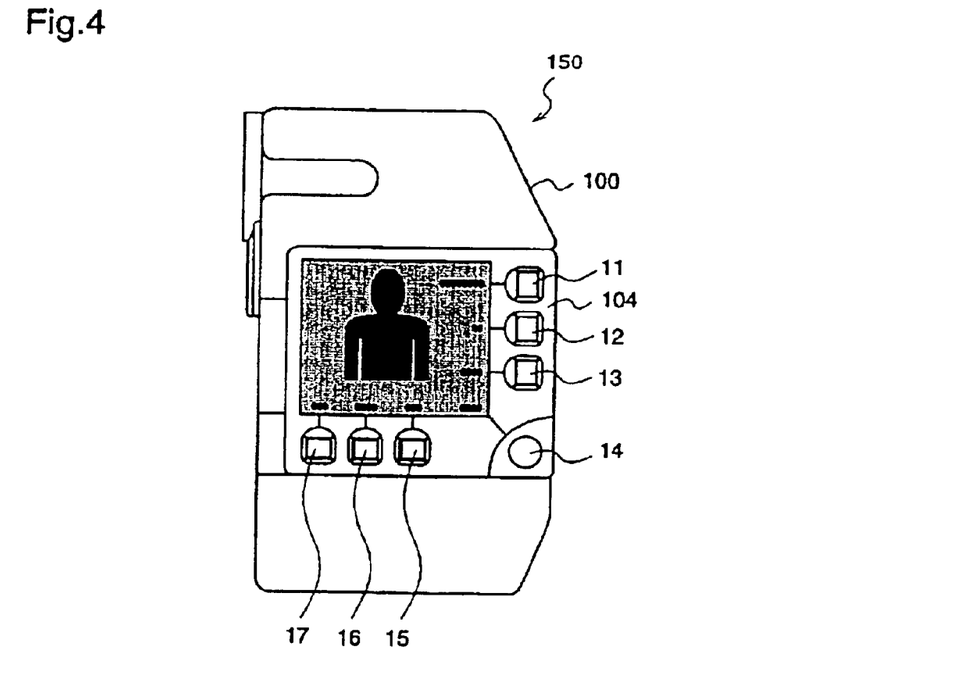
FIG. 4 is a side elevation view illustrating the editing attitude of the electronic camera recording/playback apparatus according to the first embodiment.
Figure 5:
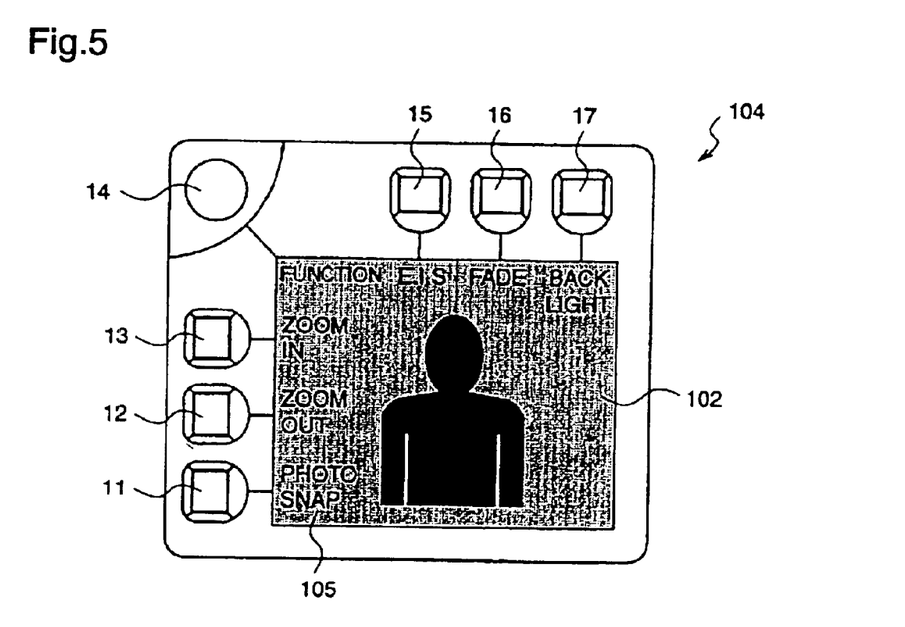
FIG. 5 is an enlarged view of a display unit which is included in the electronic camera recording/playback apparatus shown in FIG. 3.
Figure 6:
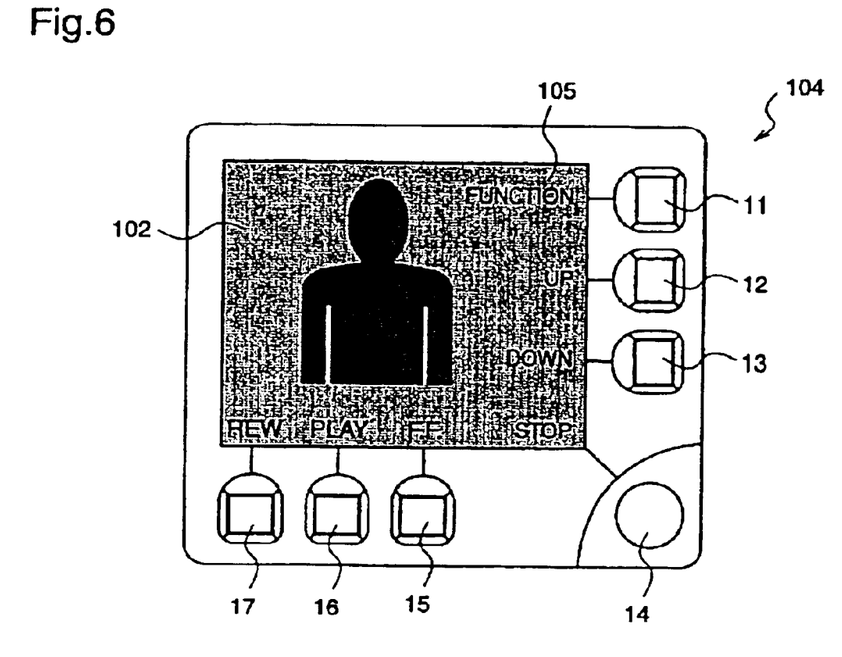
FIG. 6 is an enlarged view of a display unit which is included in the electronic camera recording/playback apparatus shown in FIG. 4.
Figure 7:
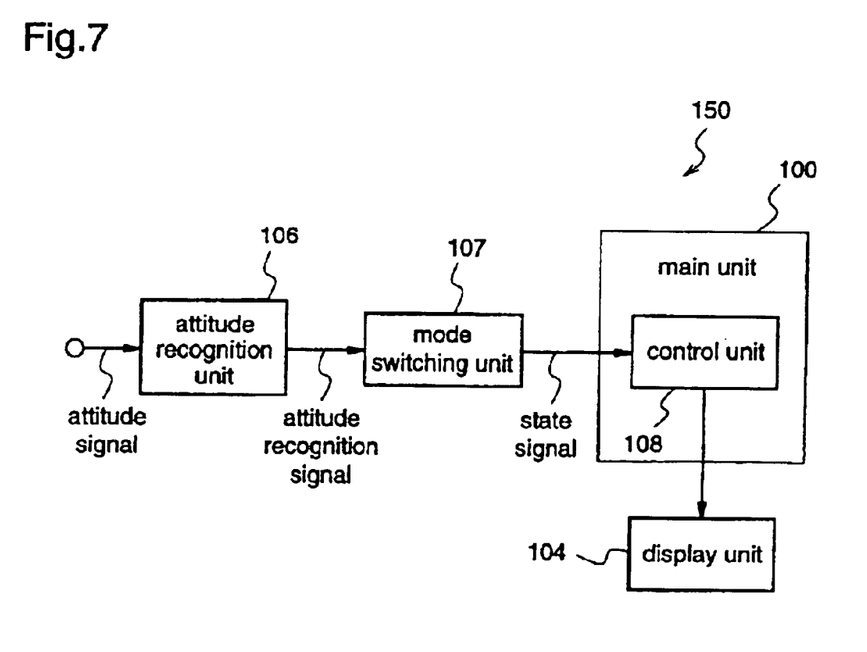
FIG. 7 is a block diagram illustrating the construction of the electronic camera recording/playback apparatus according to the first embodiment.

Initially, the construction of an electronic camera recording/playback apparatus 150 will be described with reference to FIGS. 1 to 7. FIG. 1 is a forward perspective view illustrating the closed attitude of the electronic camera recording/playback apparatus 150, FIG. 2 is a forward perspective view illustrating the shooting attitude of the apparatus 150, FIG. 3 is a rear perspective view of the apparatus 150, and FIG. 4 is a side elevation view illustrating the editing attitude of the apparatus 150. Further, FIG. 5 is an enlarged view of a display unit of the apparatus 150 in the shooting attitude, FIG. 6 is an enlarged view of the display unit in the editing attitude, and FIG. 7 is a block diagram illustrating the structure of the electronic camera recording/playback apparatus 150.

The electronic camera recording/playback apparatus 150 comprises a main unit 100, a lens 101, and a display unit 104. The display unit 104 is provided with a liquid crystal display 102 as a display screen and operation buttons 11–17. The liquid crystal display 102 serves as a finder to reflect a subject when shooting the subject, and the liquid crystal display 102 serves as a screen to be used for playing back and editing of shot data when editing the shot data.

The operation buttons 11–17 are placed on the periphery of the liquid crystal display 102, and are used correspondingly to the operations which are required for shooting and the operations which are required for editing. Further, function descriptions 105 of the operation buttons 11–17 are displayed on the liquid crystal display 102.

Further, the display unit 104 takes the following attitudes: the closed attitude in which the liquid crystal display 102 of the display unit 104 confronts the side surface of the main unit 100 and the rear surface of the display unit 104 is exposed (refer to FIG. 1); the shooting attitude in which the display unit 104 is released from the side surface of the main unit 100 (refer to FIGS. 2 and 3); and the editing attitude in which the liquid crystal display 102 is parallel to the side surface of the main unit 100 and is exposed to the outside (refer to FIG. 4).

As shown in FIG. 7, the electronic camera recording/playback apparatus 150 further includes: an attitude recognition unit 106 (attitude recognition means) for recognizing that the display unit 104 is in any one of the above-mentioned closed attitude, shooting attitude, and editing attitude; a mode switching unit 107 (mode switching means) for setting the main unit 100 in the power-off state, ready-for-shooting state, or ready-for-editing state when the attribute recognition unit 106 recognizes that the display unit 104 is in the closed attitude, shooting attitude, or editing attitude, respectively; and a control unit 108 for controlling the respective components of the electronic camera recording/playback apparatus 150 into the respective states upon the receipt of a signal outputted from the mode switching unit 107.

The attitude recognition unit 106 is, for example, a sensor, and recognizes a signal indicating each attribute of the display unit 104. The mode switching unit 107 sends a state signal to the control unit 108 so as to set the electronic camera recording/playback apparatus 150 in any one of the above-mentioned states according to an attribute recognition signal outputted from the attribute recognition unit 106. The control unit 108 controls the respective components such as the display unit 104 so as to set the electronic camera recording/playback apparatus 150 in the state that is indicated by the state signal.

Next, the operation of the electronic camera recording/playback apparatus 150 according to the first embodiment will be described with reference to the drawings. FIG. 1 shows the closed attitude, wherein the electronic camera recording/playback apparatus 150 is in the power-off state.

In the closed attitude shown in FIG. 1, when the display unit 104 is raised from the main unit 100, the display unit 104 takes the shooting attitude shown in FIGS. 2 and 3. At this time, the electronic camera recording/playback apparatus 150 is in the ready-for-shooting state. In the ready-for-shooting state, power is applied to the electronic camera recording/playback apparatus 150, and the operation buttons 11–17 are in their operable states corresponding to the respective operations which are required for shooting in the shooting attitude.

FIG. 5 is an enlarged view of the display unit 104 in the shooting attitude. With reference to FIG. 5, the functions of the operation buttons 11–17 are "PHOTO SNAP", "ZOOM OUT", "ZOOM IN", "FUNCTION", "E.I.S", "FADE", and "BACK LIGHT", respectively, and the function descriptions corresponding to the respective operation buttons 11–17 are displayed on the liquid crystal display 102. When the operator points the lens 101 at a subject, the subject is reflected on the liquid crystal display 102. While watching the subject on the liquid crystal display 102, the operator performs the processes (operations) such as adjusting the brightness of the liquid crystal display or the image quality by using the "FUNCTION" operation, zooming of the image by using the "ZOOM OUT" or "ZOOM IN" operation, correcting a blurred image by using the "E.I.S" operation, fading by using the "FADE" operation, and correcting the back light by using the "BACK LIGHT" operation, and thereafter, pressing "PHOTO SNAP" so as to take a still picture of the subject.

Next, from the shooting attitude shown in FIGS. 2 and 3, the display unit 104 is turned 180 degrees around the joint of the display unit 104 and the main unit 100 so as to make the liquid crystal display 102 face forward, and is then pushed down toward the main unit 100, whereby the display unit 104 takes the editing attitude shown in FIG. 4, and the electronic camera recording/playback apparatus 150 goes into the ready-for-editing state. At this time, the functions of the operation buttons 11–17 are changed from those corresponding to the respective operations for shooting in the shooting attitude to those corresponding to the respective operations for editing in the editing attitude.

FIG. 6 is an enlarged view of the display unit 104 in the editing attitude. In the editing attitude, the functions of the operation buttons 11–17 are "FUNCTION", "UP", "DOWN", "STOP", "F.F.", "PLAY", and "REW", respectively, and the function descriptions of the respective buttons are displayed on the liquid crystal display 102. The operator performs editing and outputs a desired image by using the functions (operations) corresponding to the respective operation buttons, such as playing back the image of the shot data by using the "PLAY" operation, fast forwarding the image by using the "F.F." operation, rewinding the image by using the "REW" operation, and stopping the image by using the "STOP" operation, while displaying the image on the liquid crystal display 102. Alternatively, the operator displays, by using the "FUNCTION" operation, an editing menu of special effects such as mosaic, mirror, wipe, mix, sepia, monotone, trail, art, high sensitivity, etc. on the liquid crystal display 102, selects a desired special effect item from the editing menu by using the "UP" and "DOWN" operation buttons 12–13, and edits and outputs a reproduced image having the selected special effect.

Next, the operation of the display unit 104 will be described.

As shown in FIGS. 3 and 5, when the display unit 104 takes the shooting attitude, the orientation of the display unit 104 is as follows. That is, with reference to the vertical direction of the main unit 100, the operation button 14 ("FUNCTION") is arranged in the upper left position of the display unit 104 as shown in FIGS. 3 and 5, the operation buttons 15, 16, 17 ("E.I.S", "FADE", "BACK LIGHT") are arranged from the left in the center-to-right position of the upper part of the display unit 104, and the operation buttons 11, 12, 13 ("PHOTO SNAP", "ZOOM OUT", "ZOOM IN") are arranged from the bottom in the center-to-bottom position of the left hand side part of the display unit 104. In the display unit 104 so oriented, the subject is displayed with its head pointing upward on the liquid crystal display 102. Further, the function descriptions 105 such as "FUNCTION" are displayed in the same vertical direction as that of the subject so that the operator can correctly read the characters of the function descriptions 105.

Next, when the attitude of the display unit 104 is changed from the shooting attitude shown in FIGS. 3 and 5 to the editing attitude shown in FIGS. 4 and 6 by the above-mentioned operation, the orientation of the display unit 104 becomes as follows. That is, with reference to the vertical direction of the main unit 100, the operation button 14 ("STOP") is arranged in the lower right position of the display unit 104 shown in FIGS. 4 and 6, the operation buttons 15, 16, 17 ("F.F.", "PLAY", "REW") are arranged from the right in the center-to-left portion of the lower part of the display unit 104, and the operation buttons 11, 12, 13 ("FUNCTION", "UP", "DOWN") are arranged from the top in the center-to-top position of the right hand side part of the display unit 104. In the display unit 104 so oriented, the subject is displayed with its head pointing upward on the liquid crystal display 102. Further, the function descriptions 105 such as "FUNCTION" are displayed in the same vertical direction as that of the subject so that the operator can correctly read the characters of the function descriptions 105.

As described above, in the electronic camera recording/playback apparatus according to the first embodiment, the display unit can take the closed attitude, the shooting attitude and the editing attitude, and is provided with the mode switching means for setting the electronic camera recording/playback apparatus in the power-off state, the ready-for-shooting state, or the ready-for-editing state when the display unit takes the closed attitude, the shooting attitude, or the editing attitude, respectively. Further, the operation buttons are used correspondingly to the respective operations which are required for shooting in the shooting attitude and the respective operations which are required for editing in the editing attitude, and the function descriptions of the operation buttons in each of the shooting attitude and the editing attitude are displayed on the display screen in positions corresponding to the respective operation buttons. Therefore, the electronic camera recording/playback apparatus of the first embodiment is easy to handle in the closed state, and the electronic recording/playback apparatus enables the operator to perform shooting and editing easily. Further, the apparatus obviates the necessity for the operator to perform mode switching. Still further, the editing functions can be increased without increasing the number of operation buttons. Furthermore, there is no need to provide the apparatus with a touch panel. Moreover, in both of the shooting attitude and the editing attitude, the operator can easily read the function descriptions.

Second Embodiment

Figure 8:
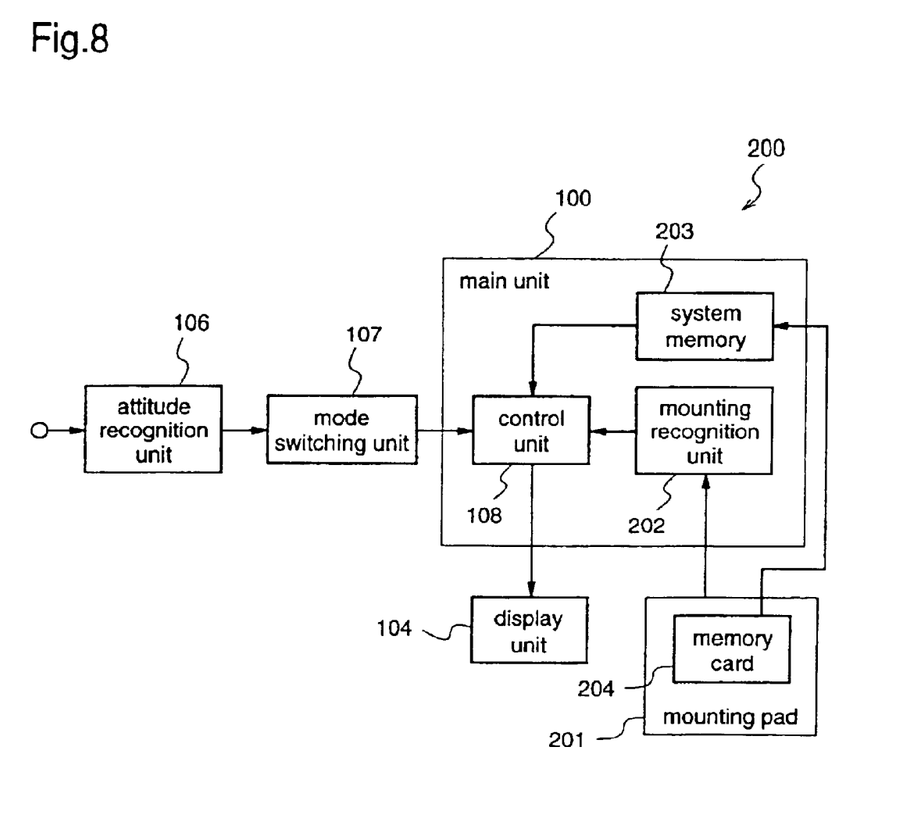
FIG. 8 is a block diagram illustrating the construction of an electronic camera recording/playback apparatus according to a second embodiment of the present invention.

Hereinafter, an electronic camera recording/playback apparatus according to a second embodiment of the present invention will be described with reference to FIG. 8. In FIG. 8, the same reference numerals as those shown in FIG. 7 designate the same or corresponding parts.

Initially, a description will be given of the structure of the electronic camera recording/playback apparatus according to the second embodiment.

In FIG. 8, reference numeral 200 denotes an electronic camera recording/playback apparatus, 204 denotes a memory card (external memory unit) for holding system data of an electronic notepad, 201 denotes a mounting pad (mounting means) on which the memory card 204 is mounted, 202 denotes a mounting recognition unit (mounting recognition means) for recognizing that the memory card 204 is mounted on the mounting pad 201, and 203 denotes a system memory (system data storage means) for holding the system data that is stored in the memory card 204.

Next, the operation of the electronic camera recording/playback apparatus 200 according to this second embodiment will be described with reference to FIG. 8. When the operator does not mount anything on the mounting pad 201, the mounting recognition unit 202 recognizes that nothing is mounted on the mounting pad 201, and the control unit 108 controls the respective components such as the display unit 104 so that the electronic camera recording/playback apparatus 200 operates as an electronic camera recording/ playback apparatus. Thereby, the electronic camera recording/playback apparatus 200 can be used, as a matter of course, as an electronic camera recording/playback apparatus.

On the other hand, when the operator mounts the memory card 204 which holds the system data of the electronic notepad on the mounting pad 201, the mounting recognition unit 202 recognizes that the memory card 204 is mounted on the mounting pad 201, and the system memory 203 stores the system data that is stored in the memory card 204. The control unit 108 controls the respective components such as the display unit 104 so that the electronic camera recording/playback apparatus 200 operates as an electronic notepad based on the system data that is stored in the system memory 203. Thereby, the electronic camera recording/playback apparatus 200 can be used as an electronic notepad.

While in this second embodiment the electronic camera recording/playback apparatus 200 uses a memory card as an external memory unit, a MD may be used instead of the memory card, or system data may be distributed from an external unit such as a personal computer. Further, while in this second embodiment the electronic camera recording/playback apparatus 200 is used as an electronic notepad, the apparatus 200 may be used as a game machine by using an external memory unit which holds system data of a game machine so long as it can be used in the attitude of the electronic camera recording/playback apparatus.

As described above, the electronic camera recording/playback apparatus according to the second embodiment is provided with the mounting means on which an external memory unit for holding system data of other equipment is mounted, the mounting recognition means for recognizing that the external memory unit is mounted on the mounting means, and the system data storage means for holding the system data that is stored in the external memory unit. Therefore, it is possible to use the electronic camera recording/playback apparatus of the second embodiment as other equipment by mounting an external memory unit for holding system data of the other equipment on the mounting means.

What is claimed is:

1. An electronic camera recording/playback apparatus operable to shoot a subject and edit shot data, said electronic camera recording/playback apparatus comprising a main unit and a display unit which is operable to display at least one of a shot image and an edited image, and is positionable to a plurality of attitudes with respect to said main unit, the plurality of attitudes including:

a closed attitude in which a display screen of said display unit confronts a side surface of said main unit, and a rear surface of said display unit is exposed;

a shooting attitude in which said display unit is released from the side surface of said main unit; and an editing attitude in which the display screen of said display unit is parallel to the side surface of said main unit and is exposed;

wherein said electronic camera recording/playback apparatus further comprises:

attitude recognition means for recognizing that said display unit is in any one of the closed attitude, the shooting attitude and the editing attitude; and mode switching means for setting said main unit in a power-off state when said attitude recognition means recognizes that said display unit is in the closed attitude, setting said main unit in a ready-for-shooting state when said attitude recognition means recognizes that said display unit is in the shooting attitude, and setting said main unit in a ready-for-editing state when said attitude recognition means recognizes that said display unit is in the editing attitude.

2. The electronic camera recording/playback apparatus of claim 1, wherein:

said display unit comprises a plurality of operation buttons arranged on the periphery of the display screen; and said plurality of operation buttons are used correspondingly for operations for shooting in the shooting attitude when said display unit is in the shooting attitude and for operations for editing in the editing attitude when said display unit is in the editing attitude.

3. The electronic camera recording/playback apparatus of claim 2, wherein said mode switching means displays respective function descriptions of each of said plurality of operation buttons in each of the shooting attitude and the editing attitude, on the display screen, in positions corresponding to each of said plurality of operation buttons, respectively.

4. The electronic camera recording/playback apparatus of claim 3, further including:

mounting means on which an external memory unit for holding system data of other equipment is mounted;

mounting recognition means for recognizing that the external memory unit is mounted on said mounting means; and system data storage means for holding the system data stored in the external memory unit.

5. The electronic camera recording/playback apparatus of claim 1 wherein:

said display unit comprises a plurality of operation buttons arranged on the periphery of the display screen; and said plurality of operation buttons are used correspondingly for operations for shooting in the shooting attitude when said display unit is in the shooting attitude and for operations for editing in the editing attitude when said display unit is in the editing attitude.

6. The electronic camera recording/playback apparatus of claim 2, wherein said mode switching unit is operable to display respective function descriptions of each of said plurality of operation buttons in each of the shooting attitude and the editing attitude, on the display screen, in positions corresponding to each of said plurality operation buttons, respectively.

7. The electronic camera recording/playback apparatus of claim 3, further including:

a mounting unit on which an external memory unit operable to hold system data of other equipment is mounted;

a mounting recognition unit operable to recognize that the external memory unit is mounted on said mounting unit; and a system data storage unit operable to hold the system data stored in the external memory unit.

8. An electronic camera recording/playback apparatus operable to shoot a subject and edit shot data, said electronic camera recording/playback apparatus comprising a main unit and a display unit which is operable to display at least one of a shot image and an edited image, and is positionable to a plurality of attitudes with respect to said main unit, the plurality of attitudes including:

a closed attitude in which a display screen of said display unit confronts a side surface of said main unit, and a rear surface of said display unit is exposed;

a shooting attitude in which said display unit is released from the side surface of said main unit; and an editing attitude in which the display screen of said display unit is parallel to the side surface of said main unit and is exposed;

wherein said electronic camera recording/playback apparatus further comprises:

an attitude recognition unit operable to recognize that said display unit is in any one of the closed attitude, the shooting attitude, and the editing attitude; and a mode switching unit operable to set said main unit in a power-off state when said attitude recognition unit recognizes that said display unit is in the closed attitude, to set said main unit in a ready-for-shooting state when said attitude recognition unit recognizes that said display unit is in the shooting attitude, and to set said main unit in a ready-for-editing state when said attitude recognition unit recognizes that said display unit is in the editing attitude.

* * * * *